United States Patent [19]

Capdebosc et al.

[11] 4,087,119

[45] May 2, 1978

[54] FLUID PRESSURE OPERATED DUCT COUPLING

[75] Inventors: André Capdebosc, Jurancon; Michel Moinard, Bizanos, both of France

[73] Assignee: Societe Nationale Elf Aquitaine (Production), Paris, France

[21] Appl. No.: 697,450

[22] Filed: Jun. 18, 1976

[30] Foreign Application Priority Data

Jun. 30, 1975 France ............................... 75 20515

[51] Int. Cl.² .......................................... F16L 35/00
[52] U.S. Cl. ...................................... 285/18; 166/120;
166/187; 285/97; 285/45; 285/306
[58] Field of Search .................... 285/18, 97, 45, 316,
285/306, 39; 166/120, 187

[56] References Cited

U.S. PATENT DOCUMENTS

| 2,831,542 | 4/1958 | Lynes et al. | 285/97 X |
| 3,032,116 | 5/1962 | Barry | 285/97 X |
| 3,099,317 | 7/1963 | Todd | 285/316 X |
| 3,222,088 | 12/1965 | Haeber | 285/316 X |
| 3,338,596 | 8/1967 | Knox | 285/18 |
| 3,365,220 | 1/1968 | Rusche | 285/306 X |
| 3,521,909 | 7/1970 | Brown | 285/3 |
| 3,638,969 | 2/1972 | Serrano | 285/18 |
| 3,819,207 | 6/1974 | Leopold | 285/45 |
| 3,982,776 | 9/1976 | Payne | 285/39 X |

FOREIGN PATENT DOCUMENTS 1,271,855 7/1969 United Kingdom.

*Primary Examiner*—Wayne L. Shedd
*Attorney, Agent, or Firm*—Lane, Aitken, Dunner & Ziems

[57] ABSTRACT

A device for connecting successive duct sections, especially between a sea-bed petroleum storage tank and a surface platform, comprising a flexible tubular joint secured at both ends to two cylindrical coupling units slidably mounted respectively within two duct sections to be coupled together, remotely operated means for anchoring each coupling unit within an end-shoe and remotely operated means for forming a tight seal between the external surface of the coupling units and the internal surface of the duct sections.

15 Claims, 5 Drawing Figures

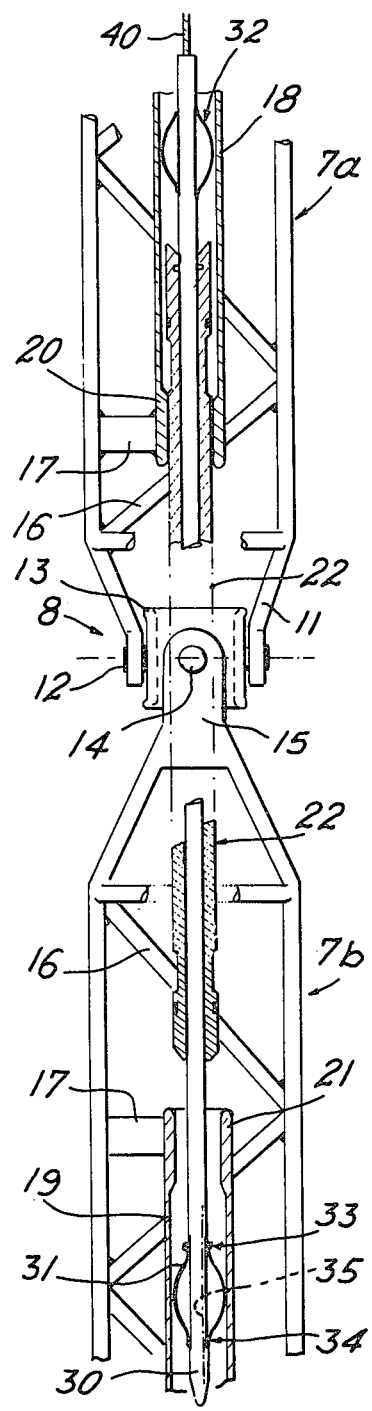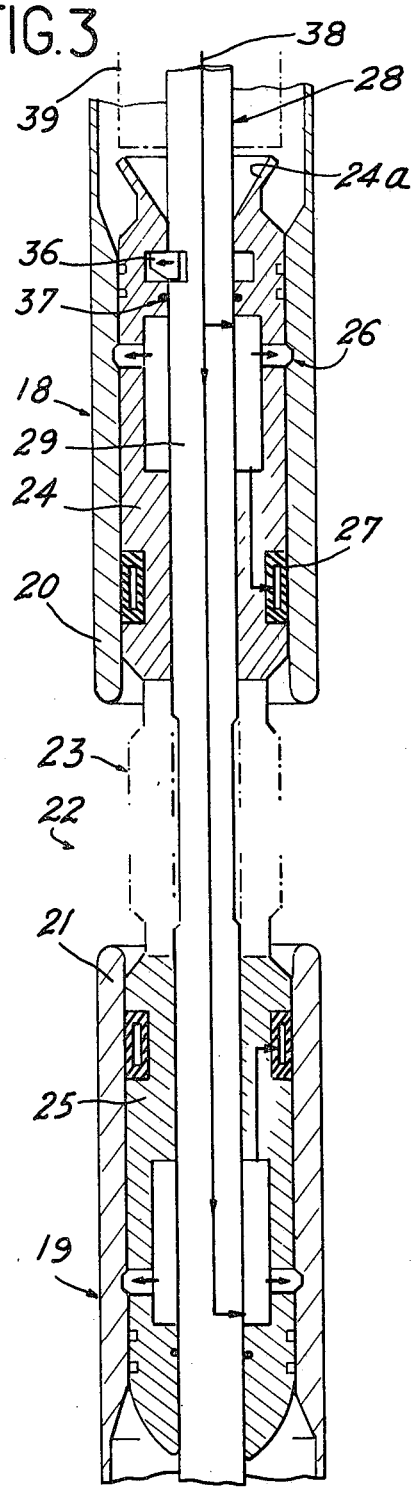

FLUID PRESSURE OPERATED DUCT COUPLING

This invention relates to a device for establishing a leak-tight connection between duct elements for the transportation of petroleum products, effluents or the like and is more especially applicable to the connection of elements of this type which are intended to establish a communication between a submarine tank for the storage of hydrocarbons and an installation of the surface platform type which is adapted to supply a carrier ship or tanker, for example.

Massive submerged structures have already been proposed in the prior art for providing a connection between the surface of the sea and a storage tank which rests on a sea bed. A structure of this type comprises an articulated assembly formed of successive rigid column elements connected together in pairs by means of an articulation of the universal joint type for permitting slight movements of relative displacement which take place between adjacent column elements when the structure has a substantial overall length and also as a result of subsurface ocean swell and the influence of deep-water currents.

A structure of this type as well as a particular method for carrying out the successive immersion of each element of the structure from the surface to the sea bed has already been disclosed in U.S. patent application Ser. No. 684,086 filed May 7, 1976. In a design of this type, each rigid column element is provided with an internal duct for the transfer of the hydrocarbon from the storage tank to the surface installation.

It can in fact be readily appreciated that, once the massive structure has been immersed in this manner, leak-tightness of the axial ducts which extend up to the full height of the structure is an essential requirement but can be obtained only when immersion of the column elements has been completed. In fact, since the method adopted for positioning the structure calls for the successive pivotal displacement of each column element as it is brought from a substantially horizontal position at the surface to a vertical position when submerged, it is not possible to connect the successive oil-duct sections from one column element to another and prior to immersion by reason of the fact that, in the sizes of components under consideration, there are no conventional joints in existence which permit bending through an angle of at least 90° as required by the mode of immersion which is thus adopted.

The present invention relates to a device for providing a connection between successive sections of oil-ducts, especially for submarine pipelines. Once the structure for carrying said duct sections has been immersed, the connecting device permits the achievement of leak-tightness between said sections from one element of the structure to the next. Positioning of the device is carried out in the upward direction from the lower portion of the duct towards the surface of the sea and at each level of separation between two successive elements by remotely operated means of simple design which are both efficient and particularly reliable.

To this end, the device under consideration comprises a flexible tubular joint placed between two duct sections which are to be connected together and which may not be in perfectly aligned relation, said joint being secured at both ends to two cylindrical coupling units slidably mounted respectively within said two duct sections, remote-controlled means for anchoring the coupling units respectively in each duct section in the vicinity of the end-shoes thereof which are placed substantially in oppositely-facing relation, and means also operated by remote control for forming a tight seal between the external surface of the coupling units and the internal surface of the duct sections. Said device is distinguished by the fact that each sliding coupling unit has an internal chamber for a cylindrical piston which is coaxial with the coupling unit and has a conical bearing surface in cooperating relation with anchoring studs displaceable within transverse bores formed through the coupling unit in uniformly spaced relation about the axis thereof. The displacement of the piston permits the movement of projection of the studs from the apparent external contour of the coupling unit and the subsequent engagement of said studs in a channel provided in the internal surface of the shoe which forms part of the corresponding duct section. Said piston comprises an end face which delimits with the bottom of the cylindrical chamber a variable-volume cavity subjected to the pressure of a fluid which produces action on the piston, a transverse abutment provided in the body of the piston, an annular shoulder parallel to the abutment and formed on a central sleeve which is coaxial with the coupling unit and the extension of which closes-off the cavity, said sleeve being thrust back by a spring applied against said annular shoulder and said abutment, and at least one inflatable seal fitted within an open channel formed in the external surface of the coupling unit in order to be applied against the internal surface of the shoe.

As an advantageous feature, the flexible tubular joint is constituted by a cylindrical tube inserted in the end portion of the coupling units which are slidably mounted in the shoes of the duct sections, annular shoulders being formed on the ends of said cylindrical tube for providing a connection with the coupling units, a coating which provides a protection against the surrounding medium being formed on the external surface of said tube.

The inflatable seal is preferably connected by means of a duct formed in the coupling unit to the variable-volume cavity through a passage which is provided in the piston and uncovers said duct once the anchoring studs are engaged in the channel of the shoe.

In accordance with a particular feature of the invention, the connecting device cooperates with a positioning tool having a generally cylindrical shape so as to engage axially within the coupling units through the flexible tubular joint. Said tool comprises means for securing it simultaneously to the two coupling units by initiating within each unit an axial displacement of the central sleeve and establishing a communication between the variable-volume cavity and a discharge orifice of a pipe placed within the tool for supplying said cavity with fluid under pressure. The displacement of the piston within the cylindrical chamber of each coupling unit under the action of the pressure of said fluid results in anchoring of said coupling units by means of the studs in the projecting positions thereof followed by inflation of the seals. The tool can then be withdrawn by releasing the central sleeve, the end extension of which closes-off the variable-volume cavity while allowing a residual pressure to remain within said cavity so as to maintain the piston in position and lock the studs in the projecting position with a view to permanently securing the coupling units to the shoes of the duct sections.

Preferably, the means for securing the tool to the coupling units are constituted by bayonet-type elements or the like which cooperate with an open groove formed in oppositely-facing relation in each coupling unit.

In accordance with a further characteristic feature which is more especially adapted to the usual case in which the oil-duct sections to be connected by means of the device in accordance with the invention have a substantially vertical axis, the coupling unit located in the lower portion of the device has a bullet-nosed extremity of revolution about its axis and the coupling unit located in the upper portion has a funnel-shaped extremity for guiding the tool.

As an advantageous feature, the positioning tool is provided at both ends on each side of the coupling units with members for centering in the oil-duct sections and constituted by flexible spring-blades which can be caused to retract within the body of the tool at the time of removal of this latter after positioning of the coupling units.

In accordance with requirements, the tool is suspended from a carrying cable containing a pipe for the admission of fluid under pressure. By way of alternative, the tool is equipped at the upper end thereof with a hydraulic power unit for delivering the fluid under pressure into the pipe which is connected to the variable-volume cavity of each coupling unit, said hydraulic power unit being remote-controlled by means of at least one electric cable.

In accordance with another characteristic feature, the tool is provided at the lower end thereof with a head for detecting the level opposite to oil-duct sections. Finally the tool is preferably provided in the external surface thereof with seals in cooperating relation with the internal surface of the coupling units once the tool has been engaged axially through the device.

Further characteristic features of a connecting device in accordance with the invention will become apparent from the following description of one exemplified embodiment which is given by way of indication and not in any limiting sense, reference being made to the accompanying drawings, wherein:

FIG. 2 is a view to a larger scale showing the connection established between two column elements in the structure according to FIG. 1 and illustrating in particular the oil-duct sections mounted within said column elements to be joined together by means of the device according to the invention;

FIG. 3 is a longitudinal sectional view to a larger scale and showing the device under consideration;

Figure 1:
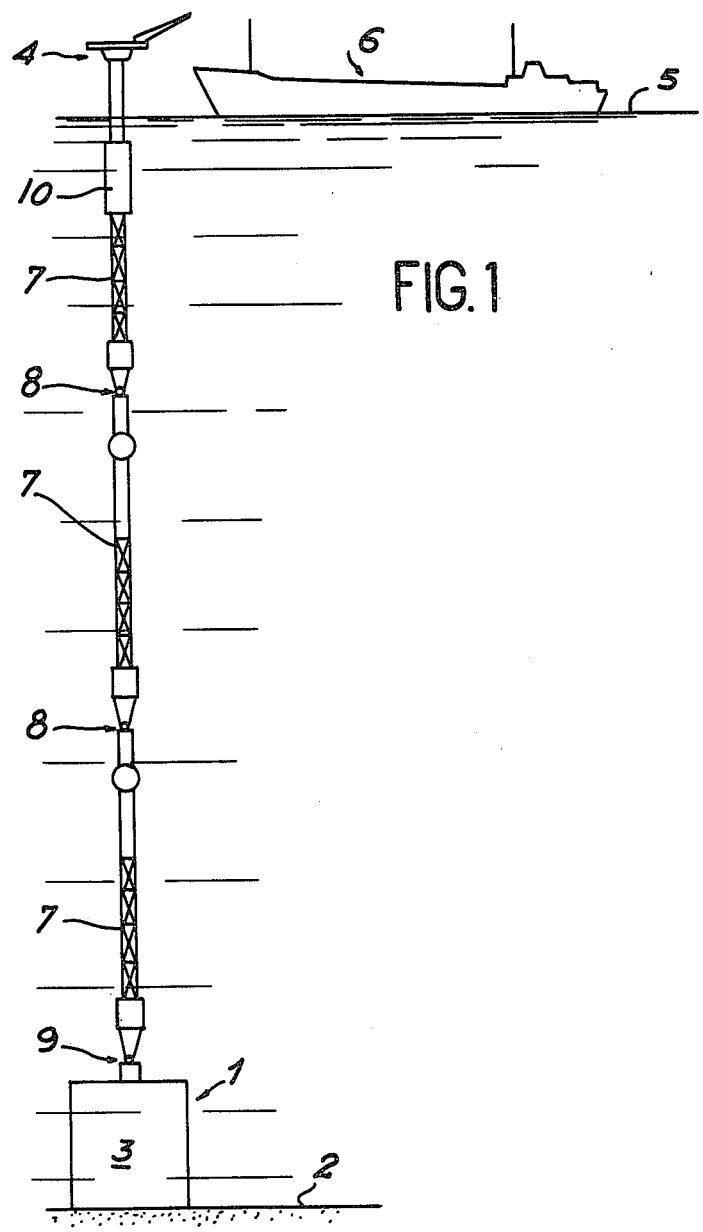
FIG. 1 is a diagrammatic view in elevation of a submerged structure formed of massive column elements which are designed to provide a connection between a submarine storage tank and the surface of the sea.

In FIG. 1, the reference numeral 1 designates a storage tank of a type known per se which is submerged on a sea bed 2 and primarily intended to contain a volume 3 of hydrocarbon. Said storage tank 1 is connected to a top floating platform 4 which emerges above the level 5 of the sea, said platform being designed and arranged so as to permit for example the loading of a carrier ship 6 with the hydrocarbon withdrawn from the storage tank 1. The connection between said tank 1 and the platform 4 is established by means of an articulated structure formed of column elements 7 which are coupled together in pairs by means of a universal-joint system 8. The connection between this structure and the storage tank is shown diagrammatically at 9 and the connection between said structure and the platform 4 is provided by another coupling component 10. Preferably, the particular structure of the column elements 7 and the method for immersing said structure and connecting it to the submarine storage tank 1 correspond to those described and illustrated in U.S. patent application Ser. No. 684,086.

It can readily be understood, however, that a continuous duct must be formed through the column elements 7 of this structure in order to ensure a leak-tight connection through these latter, especially between the storage tank 1 and the top distribution platform 4. In point of fact, the method of immersion of the column elements which calls in particular for the displacement of the elements in pivotal motion through an angle of 90° as these latter are coupled and immersed does not permit the use of conventional pipe-joints.

Referring more especially to FIG. 2, there is shown on a larger scale the particular constructional design of two successive column elements in the above-mentioned structure as designated for example by the references 7a and 7b, these elements being joined together by means of an articulated coupling 8. As an advantageous feature, the element 7a which has a substantially vertical axis is provided at the lower end thereof with a yoke 11 which carries a bearing for a first cross-pin 12. A sleeve 13 having a sufficient diameter is pivotally mounted on said cross-pin and is in turn provided with a second cross-pin 14 in the external surface thereof and in a direction at right angles to that of the cross-pin 12. A second yoke 15 which forms an extension of the top portion of the element 7b is in turn pivotally mounted on said second cross-pin. The universal-joint system thus formed permits a slight relative angular displacement of the elements 7a and 7b under the action of the stresses to which the structure may be subjected after immersion, especially as a result of swell and deep-sea currents. This is particularly true in the case in which the distance between the submarine storage tank 1 and the top platform 4 is considerable, for example of the order of several hundred meters.

Each column element 7a or 7b of the articulated structure is provided internally with a braced metallic framework 16 with transverse fixing-lugs 17 for maintaining oil-duct sections 18 and 19 respectively along the axis of the structure elements, said duct sections being intended to be coupled together in pairs by means of the device in accordance with the invention. The ducts have substantially vertical axes and are located in the line of extension of each other, subject to the relative angular displacements of the articulated coupling 8 between the elements 7a and 7b and are provided at their oppositely-facing extremities with shoes 20 and 21. In accordance with the invention, it is intended to form a leak-tight junction between said shoes in order to ensure continuity of the oil-duct, this junction being obtained by means of the connecting device shown diagrammatically in FIG. 2 and designated by the reference 22.

Figure 4:
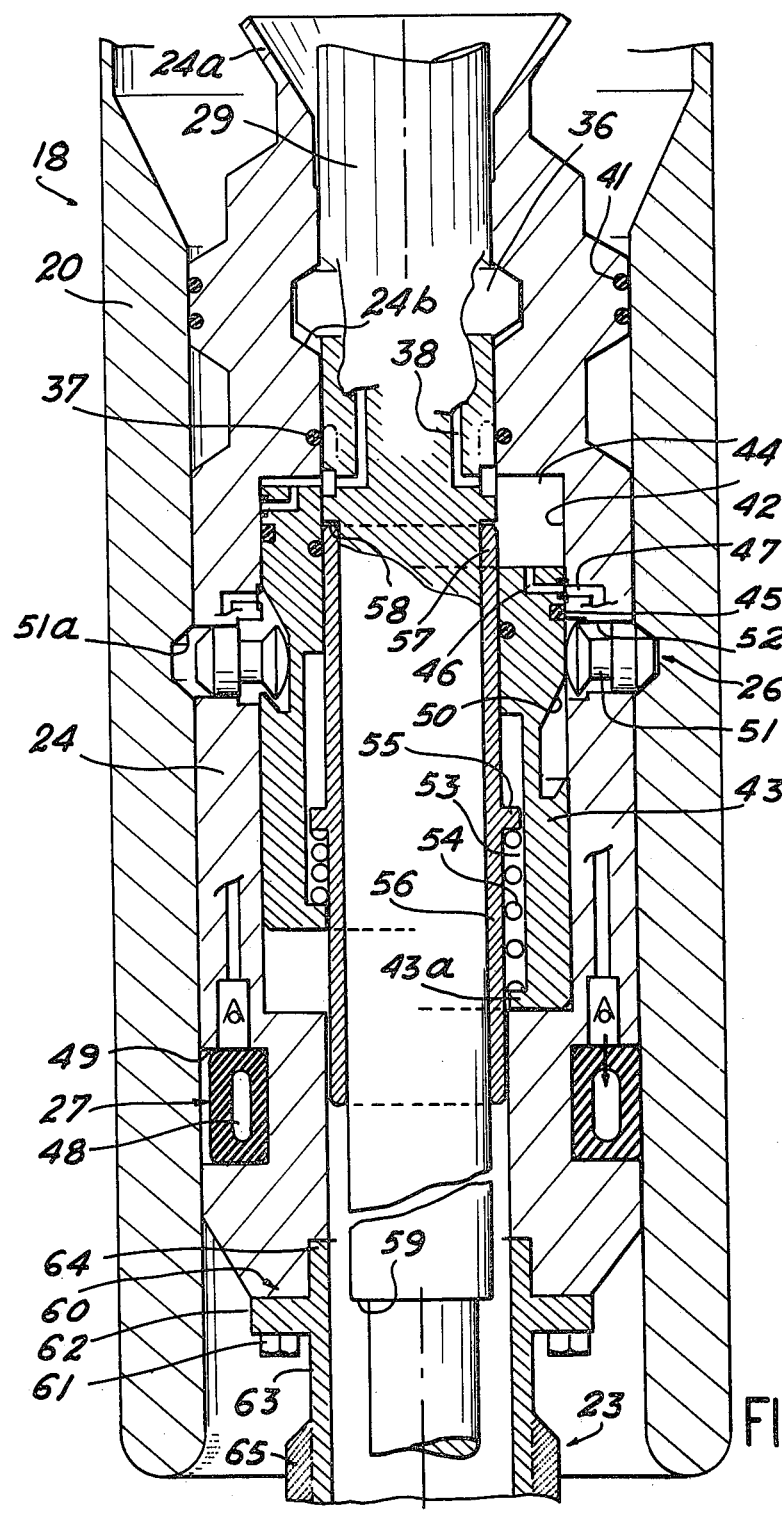
FIG. 4 is a detail view to an even larger scale illustrating the construction of one of the coupling units and of the means for anchoring and ensuring leak-tightness of this latter with respect to an end-shoe of one of the ducts.

As can accordingly be seen in greater detail in FIG. 3, said connecting device 22 mainly comprises an intermediate flexible tubular joint 23 which will be described in detail below. Said joint is connected at both ends to coupling units 24 and 25 respectively which are capable of sliding within the shoes 20 and 21 at the time of positioning inside the successive duct sections in the articulated structure. Each coupling unit 24 or 25 is provided internally with an anchoring system 26 on the internal surface of the corresponding shoe and also with an inflatable seal 27 which serves to establish the requisite degree of leak-tightness through the entire oil-duct system once the two coupling units have been placed in position and a mechanical connection has been effected between the two shoes. The coupling units are moved within their shoes and brought to a suitable level at which it is necessary to lock them in position, then to ensure their leak-tightness by means of a carrying tool 28 having a generally cylindrical shape and engaged axially through the coupling units 24 and 25 and the flexible tubular joint 23 which joins them together. Said tool 28 has a body 29 of substantial length which terminates at the lower end 30 (as shown in FIG. 2) in a tapered portion, provision being made for annular bearing shoulders 58 and 59 respectively which are formed at a suitable height on said tool (as shown in FIG. 4) and the design function of which will be explained in greater detail below. As an advantageous feature, the tool carrying the connecting device is guided through the series of oil-duct sections up to the appropriate level indicated by a detecting head (not shown) which is mounted in particular within the tip 30 as said tool is moved upwards from the sea-bed storage tank 1 through each column element in turn, depending on the length of the articulated structure. This guiding action is performed by flexible spring-blades 31 and 32 carried respectively by the cylindrical body 29 on each side of the coupling units 24 and 25. Said spring-blades are secured in particular against the body 29 by means of connecting rivets 33 or the like and are provided at the opposite ends with skids 34 enabling them to withdraw into lateral grooves 35 formed in the body 29 in a direction parallel to its axis in order to permit either withdrawal or positioning of the tool 28 once the two duct sections have been coupled together by means of the connecting device.

The tool 28 further comprises means 36 for temporary attachment to the coupling units 24 and 25, especially of the bayonet-coupling type; by way of alternative, it would be possible to employ any arrangement of an inherently conventional type for connecting the tool to the coupling units, use being made especially of a hydraulic or electric control system. Seals 37 are fitted in the surface of the internal bore of the coupling units in order to ensure leak-tightness of the body 29 of the tool 28 once this latter has been engaged. Finally, said tool is provided axially with a duct 38 for a compressed fluid under pressure, the intended function of which will hereinafter be defined. Said duct 38 is connected by means of piping (not shown) to the top platform 4 or can alternatively be connected to a hydraulic power unit 39 which is illustrated in FIG. 3 and mounted on the tool itself at the end of the upper coupling unit 24 of the connecting device. A cable 40 in which the pipe for supplying fluid under pressure and/or the electric control leads of the power unit may be incorporated serves to control the handling of the tool 28 and especially the downward displacement of this latter within the duct sections of the structure followed by withdrawal of said tool when the connecting device has been placed in position. Finally, as shown in FIG. 3, the coupling units 24 and 25 have respectively a funnel-shaped profile 24a at the upper end of the unit 24 and a bullet-nosed profile 25a at the lower end of the unit 25. In the case of the coupling unit 24, this design permits suitable penetration of the tool 28 into the units. In the case of the coupling unit 25, this design permits sliding motion of the assembly formed by the tool, the coupling units and the flexible tubular joint which connects them together, at the time of downward displacement of the tool within the structure to the level of the duct sections to be connected together.

FIG. 4 illustrates more especially the practical design of the coupling unit 24 of the connecting device 22 and of the tubular joint 23 which is associated therewith, particularly in regard to the means 26 for anchoring said coupling unit to the oppositely-facing end-shoe 20 and in regard to the control of the inflatable seal 27. Only the upper coupling unit 24 is shown in this figure since it is understood that the lower coupling unit 25 has exactly the same components which are in any case controlled in synchronism with those of the first coupling unit in order to carry out simultaneously the engagement of the device with the two duct sections to be coupled together, to ensure leak-tightness of these latter, and finally to withdraw the tool.

The coupling unit 24 is fitted in the first place with a series of O-ring seals 41 in the external surface thereof in order to ensure a first leak-tight seal once the unit has been placed in position within the shoe 20. In addition, said coupling unit is provided internally with a cylindrical chamber 42 which is open towards the bore of the coupling unit. An annular piston 43 which is coaxial with the coupling unit is mounted within said cylindrical chamber and delimits with the top end-wall of the cylindrical chamber 42 a cavity 44 having a variable volume according to the position of said piston. Segments 45 are mounted in the external surface of the sliding piston 43 in order to ensure tightness against in-leaking during movements of said piston. At the upper end thereof, the piston 43 is provided with an elbowed duct 46 which is capable of coming into a position of exact correspondence with the extremity of a duct 47 formed through the body of the coupling unit 24 when the piston reaches its bottom position in abutment with the bottom of the cylindrical chamber, the volume of the cavity 44 being of maximum value at that time. Said duct 47 communicates through the body of the coupling unit 24 with the inflatable seal 27, this latter being mounted within an open channel 49 formed in the external surface of the coupling unit. Said seal 27 has an internal cavity 48 which is put into communication with the duct 47 so as to ensure that the compressed fluid supplied from the cavity 44 via the duct 46 in the manner indicated inflates the seal 27 and ensures fluid leak-tightness of the coupling unit 24 with respect to the shoe 20.

A conical bearing surface 50 is formed in the external surface of the piston 43 and intended to cooperate with studs 51 which constitute the anchoring system 26 of the coupling unit. Said studs 51 are capable of sliding transversely within radial bores 52 placed at uniform intervals around the axis of the coupling unit and formed through the body of said unit in order to establish a communication between the external surface of this latter and the cylindrical chamber 42 at the level of the piston 43. Under these conditions, when the piston is in the top position, the studs 51 are in the retracted position within the body of the coupling unit; this latter is carried by the tool 28 and can be moved freely through the duct sections to the level of positioning of the connecting device. On the other hand, when the piston 43 is displaced to the bottom position under the action of a pressure of fluid which is admitted within the cavity 44, the conical bearing surface 50 progressively thrusts back the studs 51 and causes them to project outwards from the coupling unit and to engage within a channel 51a formed in oppositely-facing relation in the internal surface of the shoe 20, thus locking the coupling unit in position with respect to said shoe.

The piston 43 is also provided in that surface which is directed towards the interior of the coupling unit and at the lower end thereof with a longitudinal cavity 53 in which is mounted a coaxial spring 54. Said spring is applied at one end against an abutment 43a formed at the base of the piston 43 and at the other end against an annular shoulder 55 which forms part of the external surface of a sliding sleeve 56, the upper extension 57 of said sleeve being so arranged as to ensure that the cavity 44 is closed laterally within the cylindrical chamber 42 when the tool 28 is withdrawn from the coupling unit. To this end, said upper extension 57 of the sleeve 56 cooperates with the annular flange 58 formed in the body of the tool 29, thereby ensuring that said sleeve 56 is thrust back at the time of positioning of the tool within the connecting device in order to bring this latter to the level of the oil-duct sections to be coupled together, a communication being then established between the cavity 44 and the duct 38 for supplying the fluid under pressure. As the cavity 44 is filled with said fluid, the piston 43 is thrust downwards in opposition to the spring 54, thus subjecting the studs 51 to a lateral effort in order to cause these latter to engage within the channel 51a of the shoe 20. At the end of travel, the compressed fluid is discharged through the duct 46 and the pipe 47 towards the seal 27, thus ensuring a tight seal with the shoe immediately after anchoring of the coupling unit. It is readily apparent that similar operations are carried out at the same time on the coupling unit 25, the two coupling units 24 and 25 being locked against the shoes 20 and 21 at the same time while ensuring continuous leak-tightness of the oil-duct through the sections 7a and 7b (FIG. 2) which are thus coupled together.

By way of alternative, the anchoring of the two coupling units could equally well be differentiated in time, thereby making it possible in the event of a slight variation in length to carry out locking of the first coupling unit followed by anchoring of the second unit after having applied an axial force to the flexible tube while taking into account this variation in length. The body 29 of the tool can then be withdrawn; the movement of withdrawal of the body 29 after unlocking of the temporary anchoring means 36 makes it possible for the sleeve 56 to move upwards within the coupling unit 24 to a slight extent. In consequence, the cavity 44 is closed-off laterally by the upper extension 57 of said sleeve 56 and progressively as said movement of withdrawal takes place so as to maintain a sufficient residual pressure within said cavity. The piston 43 accordingly remains in the position in which it locks the studs 51 whilst the residual pressure within the seal 27 maintains leak-tightness. By means of a second annular shoulder 59, the tool 28 produces action on a similar sleeve mounted within the lower coupling unit 25.

Finally, FIG. 4 illustrates in greater detail the practical design of the flexible tubular joint 23 for establishing a leak-tight connection between the two coupling units 24 and 25. At the lower end thereof, the coupling unit 24 for example has an end surface 60 against which an annular shoulder 62 is applied and locked in position by means of a nut 61. Said shoulder has an extension in the form of a flexible tube 63 of neoprene or any suitable material of the same type and is provided with an inset end-piece 64 for centering and sealing which penetrates to a slight extent within the bore of the coupling unit. Finally, the external surface of the tube 63 is advantageously coated with a layer 65 of material which affords protection against the surrounding environment. This protective coating is intended to limit the potential danger of collapse of the central tube under the pressure of the external medium and to accommodate tensile stresses during operation of the installation.

There is thus provided a connecting device in which the locking and sealing means can readily be remote-controlled over the entire length of the articulated structure once this latter has been erected on site. The sufficient flexibility of the tubular element of the device makes it possible in addition to tolerate the relative angular displacements of the structural elements which take place under the action of the stresses applied to these latter and which are always limited, while permitting continuity of the oil duct in all cases. Furthermore, the possibility of disassembly of this structure in the event of an accident condition can readily be contemplated without the assistance of divers which would in fact be available only at relatively small immersion depths.

Figure 5:
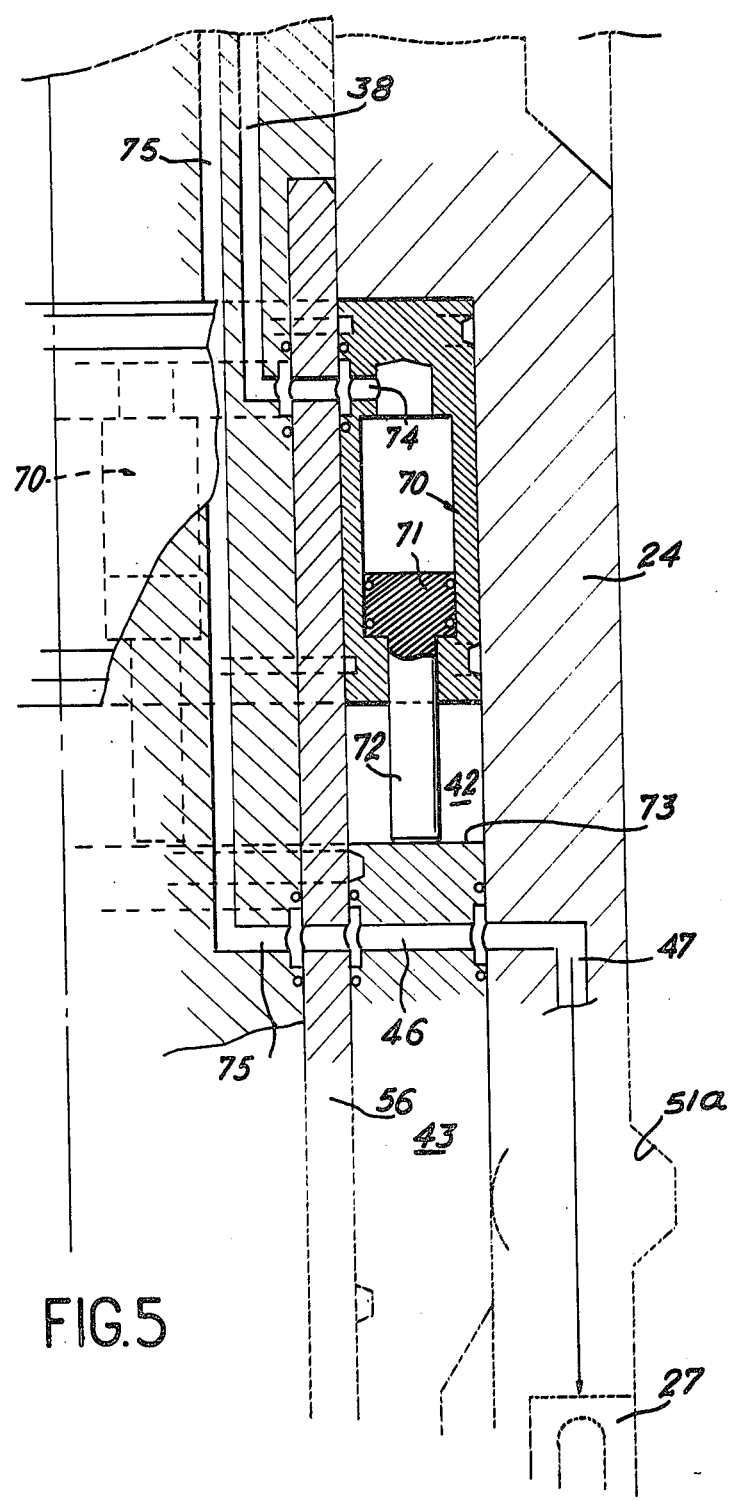
FIG. 5 illustrates an alternative form of a constructional detail of the coupling unit in accordance with FIG. 4.

It is readily apparent that the invention is not limited solely to the example of construction which has been described with reference to the accompanying drawings but extends on the contrary to all alternative forms. Especially worthy of note is the fact that a different form of construction could be adopted for the tool which carries the device. In particular, said tool could be so designed as to have a body formed in two parts with a universal-joint assembly so as to provide said body with a certain degree of flexibility. It would also be possible to employ spacer rings in order to adjust the length of the tool and to ensure suitable coincidence between its means of engagement with the coupling units and the oppositely-facing channels of these latter. Similarly, the constructional design of the means for anchoring the coupling unit to the corresponding duct and the utilization of the sealing components on completion of this anchoring operation can be modified, especially as shown in FIG. 5. In this figure, there are again shown in particular the coupling unit 24, the sleeve 56, the piston 43 and the cylindrical chamber 42 which communicates with the duct 38 for supplying said cylindrical chamber with a fluid medium in order to control the displacement of the piston 43 and to produce action on the anchoring studs, thus permitting the engagement of said studs within the channels 51a. In this case, however, the useful volume of the cylindrical chamber 42 has been limited to an appreciable extent by placing auxiliary cylinders 70 within this latter. These auxiliary cylinders are uniformly spaced within said cylindrical chamber about the axis of the coupling unit 24 and are each fitted with a piston 71 extended by a rod 72 which emerges from the cylinder 70 and is intended to be applied against the top flat surface 73 of the main piston 43. The cylinders 70 communicate through ducts 74 with the supply pipe 38 in order to permit displacement of the rods 72 and to exert a well-distributed effort on the piston 43. This solution has the advantage of limiting the volume of control fluid required while ensuring a degree of operational safety which is similar to that of the solution proposed in FIG. 4. In this alternative embodiment, a second duct 75 is intended to communicate with the duct 46 through the main piston 43 at the end of travel of this latter for the purpose of inflating the seals 27.

What we claim is:

1. A connecting device for providing a flexible fluid tight connection between the ends of two articulatable duct sections comprising:

a flexible tubular joint;

a cylindrical connecting unit having an axial passage therethrough secured to each end of said joint, each of said connecting units adapted to be inserted into an end portion of a duct section, each of said connecting units including; a fluid operable piston mounted for translation in an annular chamber formed in said connecting unit, said piston having a conical exterior surface portion and translatable along said axis between a first position and a second position;

movable studs mounted in a bore formed in said connecting unit transverse to said axis and having an end in contact with said surface portion; said studs movable in response to translation of said piston from a retracted position when said piston is in a first position to an anchoring position when said piston is in its second position in which the other end of said studs project outwardly of said connecting unit to engage an anchoring channel formed in said duct section;

a variable volume chamber defined between an end of said piston and said chamber to receive fluid under pressure from a fluid pressure source to cause translation of said piston along said axis from said first position to said second position and thereby cause said studs to anchor said connecting unit to said duct section; and a fluid inflatable seal disposed in a channel formed in the exterior surface of said connecting unit and which is in selective communication with said fluid pressure source to thereby inflate said seal to provide a fluid type seal between said connecting unit and said duct section.

2. The connecting device claimed in claim 1, further comprising:

a fluid control means to permit inflation of said seal means only after said studs have anchored said connecting units to said duct section.

3. The connecting device claimed in claim 2, wherein said fluid control means comprises:

a first fluid passage formed in said connecting unit having an end communicating with said inflatable seal and having another end opening into said chamber; and a second fluid passage formed in said piston and having an end opening onto said one end of said piston defining said variable volume chamber and having another end opening onto another side of said piston such that said other ends of said first and second fluid passages are in registration with one another when said piston is in its second position to thereby provide fluid communication between said variable volume chamber and said inflatable seal.

4. The connecting device claimed in claim 1, further comprising:

a protective coating on said flexible tubular joint for accommodating tensile stresses arising during the installation of said connecting device.

5. The connecting device claimed in claim 1, further comprising:

selectively operable valve means to selectively communicate said fluid pressure source with said variable volume chamber.

6. The connecting device claimed in claim 5, further comprising:

a cylindrical tool insertable to said connecting units and said joint and having a duct formed therein communicating with said fluid pressure source; and means on said tool to operate said valve means to communicate said fluid pressure source with said variable volume chamber.

7. The connecting device claimed in claim 5, wherein said valve means comprises:

a tubular sleeve defining a sidewall of said variable volume chamber;

said tubular sleeve reciprocally slidable along said axis from a position wherein said variable volume chamber is closed off from said fluid pressure source to a position wherein said variable volume chamber is in fluid communication with said fluid pressure source.

8. The connecting device claimed in claim 7, further comprising:

biasing means to resiliently bias said tubular sleeve to said closed off position.

9. The connecting device claimed in claim 7, further comprising:

a cylindrical tool insertable through said connecting units and said joint and having a duct formed therein communicating with said fluid pressure source; and means on said tool to slide said tubular sleeve along said axis to said position wherein said variable volume chamber is in fluid communication with said fluid pressure source.

10. The connecting device claimed in claim 9, further comprising:

means on said tool for selectively securing said tool to each of said connecting units.

11. The connecting device claimed in claim 10, wherein said securing means comprises:

bayonet type elements selectively cooperable with a groove formed in each of said connecting units.

12. The connecting device claimed in claim 9, further comprising:

flexible spring blades at both ends and on each side of said tool for centering said tool within said duct sections.

13. The connecting device claimed in claim 9, wherein said fluid pressure source comprises:

a hydraulic power unit at the upper end of said tool.

14. The connecting device claimed in claim 9, further comprising:

a detector head located at the lower end of said tool for detecting the position of said tool relative to said duct sections.

15. The connecting device claimed in claim 1, wherein:

said duct sections are aligned along a substantially vertical axis;

the upper end of the upper connecting unit has a funnel-shaped extremity; and the lower end of the lower connecting unit has a bullet nosed extremity of revolution.

* * * * *